(12) United States Patent
Grunwald et al.

(10) Patent No.: US 10,974,704 B2
(45) Date of Patent: Apr. 13, 2021

(54) RAIL VEHICLE BRAKE SYSTEM HAVING A CONDITIONING DEVICE, CONDITIONING DEVICE, METHOD FOR OPERATING A CONDITIONING DEVICE, AND METHOD FOR DEICING AND/OR FOR PREVENTING ICING OF A BRAKE UNIT OF A RAIL VEHICLE BRAKE SYSTEM

(71) Applicant: KNORR-BREMSE SYSTEME FÜR SCHIENENFAHRZEUGE GMBH, Munich (DE)

(72) Inventors: Torsten Grunwald, Seehausen am Staffelsee (DE); Nicolas Lange, Feldafing (DE); Frank Büttner, Werder/Hoveö (DE); Jörg Huber, Munich (DE); Rainer Rau, Geretsried (DE)

(73) Assignee: KNORR-BREMSE SYSTEME FUR SCHIENENFAHRZEUGE GMBH, Munich (DE)

(*) Notice: Subject to any disclaimer, the term of this patent is extended or adjusted under 35 U.S.C. 154(b) by 211 days.

(21) Appl. No.: 15/313,813

(22) PCT Filed: May 26, 2015

(86) PCT No.: PCT/EP2015/061595
§ 371 (c)(1),
(2) Date: Nov. 23, 2016

(87) PCT Pub. No.: WO2015/181174
PCT Pub. Date: Dec. 3, 2015

(65) Prior Publication Data
US 2017/0197597 A1 Jul. 13, 2017

(30) Foreign Application Priority Data
May 26, 2014 (DE) ............... 10 2014 107 402.5

(51) Int. Cl.
*B60T 13/66* (2006.01)
*B60T 8/17* (2006.01)
(Continued)

(52) U.S. Cl.
CPC .......... *B60T 8/1705* (2013.01); *B60T 13/665* (2013.01); *B60T 17/228* (2013.01); *B61H 5/00* (2013.01);
(Continued)

(58) Field of Classification Search
CPC ...... B60T 8/1705; B60T 8/321; B60T 8/3235; B60T 13/665; B60T 17/228; B61H 5/00; B61H 11/00
See application file for complete search history.

(56) References Cited

U.S. PATENT DOCUMENTS 3,845,991 A * 11/1974 Engle .................. B60L 3/108
303/3
4,402,047 A * 8/1983 Newton .............. B60T 8/1766
303/191
(Continued)

FOREIGN PATENT DOCUMENTS

CN 1568405 A 1/2005
DE 102011113073 A1 3/2013
(Continued)

OTHER PUBLICATIONS

Search report for International Patent Application No. PCT/EP2015/061595; dated Aug. 25, 2015.
(Continued)

*Primary Examiner* — Bradley T King
(74) *Attorney, Agent, or Firm* — Barnes & Thornburg LLP

(57) ABSTRACT

The invention relates to a rail vehicle brake system comprising a conditioning device, having at least one disc brake
(Continued)

per axle, the conditioning device having a control device. The conditioning device is formed having at least one wagon control unit and at least one coupling unit for selective actuation of the at least one disc brake per axle. The invention further relates to a conditioning device and to a method for operating a conditioning device, and to a method for deicing and/or for preventing icing of a brake unit of a rail vehicle brake system.

18 Claims, 3 Drawing Sheets

(51) Int. Cl.
    *B60T 17/22*     (2006.01)
    *B61H 5/00*     (2006.01)
    *B61H 11/00*     (2006.01)
    *B60T 8/32*     (2006.01)

(52) U.S. Cl.
    CPC .............. *B61H 11/00* (2013.01); *B60T 8/321* (2013.01); *B60T 8/3235* (2013.01)

(56) References Cited

U.S. PATENT DOCUMENTS

| | | | | |
|---|---|---|---|---|
| 4,498,711 A * | 2/1985 | Langley | ................... | B60T 17/18 303/1 |
| 5,407,032 A * | 4/1995 | Gaudefroy | ............... | B61H 5/00 188/218 XL |
| 5,887,953 A * | 3/1999 | Wood | ................... | B60T 8/1893 303/15 |
| 6,120,109 A * | 9/2000 | Wood | ................... | B60T 8/1881 303/15 |
| 6,250,723 B1 * | 6/2001 | Barberis | ............... | B60T 8/3235 303/15 |
| 6,669,308 B1 * | 12/2003 | Aurich | ................... | B60T 8/1893 303/15 |
| 8,565,992 B2 * | 10/2013 | Fuchs | ...................... | B60L 7/06 701/22 |
| 9,126,605 B2 | 9/2015 | Mayer et al. | | |
| 2004/0011596 A1 * | 1/2004 | Miller | .................... | B60T 17/22 188/1.11 W |
| 2005/0212354 A1 * | 9/2005 | Tione | .................... | B60T 8/1705 303/20 |
| 2006/0226698 A1 * | 10/2006 | Riebe | .................... | B60T 8/1703 303/20 |
| 2007/0205657 A1 * | 9/2007 | Bradley | ................ | B60T 8/1705 303/8 |
| 2014/0345491 A1 * | 11/2014 | Scharpf | ..................... | B60L 7/24 105/1.4 |
| 2015/0307071 A1 * | 10/2015 | Bradley | ................ | B60T 13/266 303/20 |

FOREIGN PATENT DOCUMENTS

| | | | |
|---|---|---|---|
| DE | 102012213550 A1 | 2/2014 | |
| DE | 102012213552 A1 | 2/2014 | |
| EP | 0855319 A2 * | 7/1998 | ............ B60T 8/3235 |
| WO | 2013034731 A2 | 3/2013 | |

OTHER PUBLICATIONS

German Office Action for Corresponding German Application No. 10 2014 107 402.5, dated Feb. 19, 2015.

Chinese Office Action for Corresponding Chinese Application No. 2015800279031, dated Jul. 13, 2018.

* cited by examiner

RAIL VEHICLE BRAKE SYSTEM HAVING A CONDITIONING DEVICE, CONDITIONING DEVICE, METHOD FOR OPERATING A CONDITIONING DEVICE, AND METHOD FOR DEICING AND/OR FOR PREVENTING ICING OF A BRAKE UNIT OF A RAIL VEHICLE BRAKE SYSTEM

CROSS REFERENCE AND PRIORITY

Priority Paragraph

This patent application is a U.S. National Phase of International Patent Application No. PCT/EP2015/061595, filed May 26, 2015, which claims priority to German Patent Application No. 10 2014 107 402.5, filed May 26, 2014, the disclosures of which are incorporated herein by reference in their entirety.

FIELD

The disclosed embodiments relate to a rail vehicle brake system, in particular for a high-speed rail vehicle, with a conditioning device. The disclosed embodiments also relate to a corresponding conditioning device. Furthermore, the disclosed embodiments relate to a method for the operation of such a conditioning device and to a method for deicing and/or for preventing icing of a brake unit of a rail vehicle brake system.

BACKGROUND

Rail vehicle brake systems are usually fitted with pneumatic brake systems that comprise disc brakes. Both the friction lining/brake disc interface and also the kinematics of a brake calliper of the disc brake can be adversely affected by winter conditions, such as e.g. by icing, freezing melt water, snow smoke etc.

SUMMARY

Different types of conditioning braking have been proposed for improving the braking effect under certain conditions, which are e.g. known as snow brakes or polishing brakes. These can be operated as a driver instruction or automatically. The document BVF5 R2, ISBN 978-91-7501-121-9 is mentioned as an example for illustration. Low brake pressures are generally used in order to avoid decelerating the rail vehicle too strongly or to avoid excessive counter traction demands.

The formation of a film of water between the friction lining and the brake disc under winter conditions and/or brake pressures that are too low for rail vehicles in high-speed traffic can be a significant cause of so-called metal pickups. This can result in signs of erosion on the brake disc.

The object of the disclosed embodiments is to provide an improved rail vehicle brake system.

Another object is to provide an improved conditioning device.

Yet another object is to specify a method for the operation of a conditioning device.

Yet another object is to specify a method for deicing and/or for preventing icing of a brake unit of a rail vehicle brake system.

Using a conditioning device with a carriage controller and a coupling unit for the selective control of a disc brake per axle, reliable conditioning of the friction partners at a high temperature level can be achieved, wherein only a minimal increase of the traction power of a train is necessary during conditioning braking.

This enables deterioration of the surfaces of the brake disc and friction linings to be significantly reduced, wherein reworking of the brake disc and replacement of the friction linings/brake disc friction partners have to take place less often.

A rail vehicle brake system according to the disclosed embodiments with a conditioning device, comprising at least one disc brake per axle, comprises a conditioning device with a control device. The conditioning device is designed for the selective control of the at least one disc brake per axle with at least one carriage control unit and at least one coupling unit.

A method according to the disclosed embodiments for the operation of a conditioning device may comprises (S1) activating the conditioning device; (S2) recording project-specific factors at inputs of a control device of the conditioning device; and (S3) selective control of brake units of the rail vehicle brake system for the operation of the conditioning device.

A method according to the disclosed embodiments for deicing and/or for preventing icing of a brake unit of a rail vehicle brake system comprises the procedural steps:(S1) activating the conditioning device; (S2) recording a brake temperature of the brake unit at the inputs of the control device of the conditioning device; and (S3) selective control of brake units of the rail vehicle brake system for deicing and/or for preventing icing of the brake unit.

In one embodiment, the conditioning device is designed for selective control of the at least one disc brake per axle at the axle level such that the control device is coupled to an axle brake controller of the at least one disc brake. The brakes per axle can thus be controlled independently of other axles. Sequential control of all axles is possible, whereby the traction power only has to be increased slightly.

Alternatively, the conditioning device can be designed for selective control of the at least one disc brake per axle at the bogie level or/and the carriage level, such that the control device is coupled using the carriage control unit to the axle brake controller of each of at least one disc brake per axle. So according to project-specific factors, e.g. speed, train configuration, loading, friction values, temperatures, weather conditions, track conditions, it is also possible to carry out conditioning braking not only axle by axle, but in a greater number of axles, wherein an increase of the traction power can be kept small.

In another embodiment, the conditioning device can be coupled using the at least one coupling unit to the axle brake controller of the at least one disc brake. This gives the advantage that existing installations can be retained to a large extent, wherein the coupling unit forms an interface between the conditioning device and the existing brake system. Only part of the pneumatic brake system of a train or multi-element train needs to be selectively controlled.

The conditioning device is designed as a closed and independent system with pneumatic actuators and electronic controllers. This gives a compact and space-saving construction.

If the conditioning device also comprises a control unit, a manual intervention for activating/deactivating and exerting influence can take place.

In another embodiment it is provided that the control device of the conditioning device comprises inputs for project-specific factors, wherein the project-specific factors represent e.g. speed, vehicle configuration, loading, coefficient of friction, external temperature, traction power, distance and the like. The inputs can be connected to higher-level control systems (brake controller, vehicle controller) and so receive important parameters for control.

For a particularly compact construction, the conditioning device is designed as an integral, independent component of a brake controller, vehicle controller or as a separate functional unit.

A conditioning device according to the disclosed embodiments is designed for the rail vehicle brake system described above.

In one embodiment of the method according to the disclosed embodiments, activation takes place in the procedural step (S1) automatically or/and manually. A higher-level intervention by a person is thus possible.

If in procedural step (S2) recording project-specific factors, additional parameters are recorded, such as e.g. temperatures very close to the brake units or of functional units of the brake units, advantageous adaptation of the selective control is possible.

In procedural step (S3) selective control, the control can be carried out in a defined sequence for a defined time at the axle, bogie or carriage level depending on the train configuration. These times can be specified, but also subsequently influenced, e.g. by learning software or by manual intervention.

In another embodiment, (S3) selective control with simultaneously detected measurement values, e.g. vehicle speed, traction power, brake pressure, brake temperature etc., is regulated such that the operating speed of the entire vehicle is unchanged or is essentially unchanged. This enables advantageous efficient minimization of the traction power during simultaneous conditioning braking. Higher application pressures are thus possible during conditioning braking.

In another embodiment, (S3) selective control, control of the friction brakes can take place using the recorded project-specific factors outside of the defined sequence if a factor exceeds or falls below a previously specified limit value. Adaptation to the ambient conditions can thus take place rapidly.

Disclosed embodiments may provide inter alia the following advantages, wherein winter-related conditions, which favour a metal pickup, are avoided. Reliable conditioning of the friction partners to the required, where applicable high, temperature level. The use of high lining contact pressures in conjunction with minimal deceleration of the whole vehicle. Minimal increase of the traction power of the whole vehicle during conditioning braking. Maintaining the operating speed during continuous conditioning braking.

BRIEF DESCRIPTION OF FIGURES

Disclosed embodiments is explained in greater detail below with reference to the drawings, in which.

DETAILED DESCRIPTION

Figure 1:
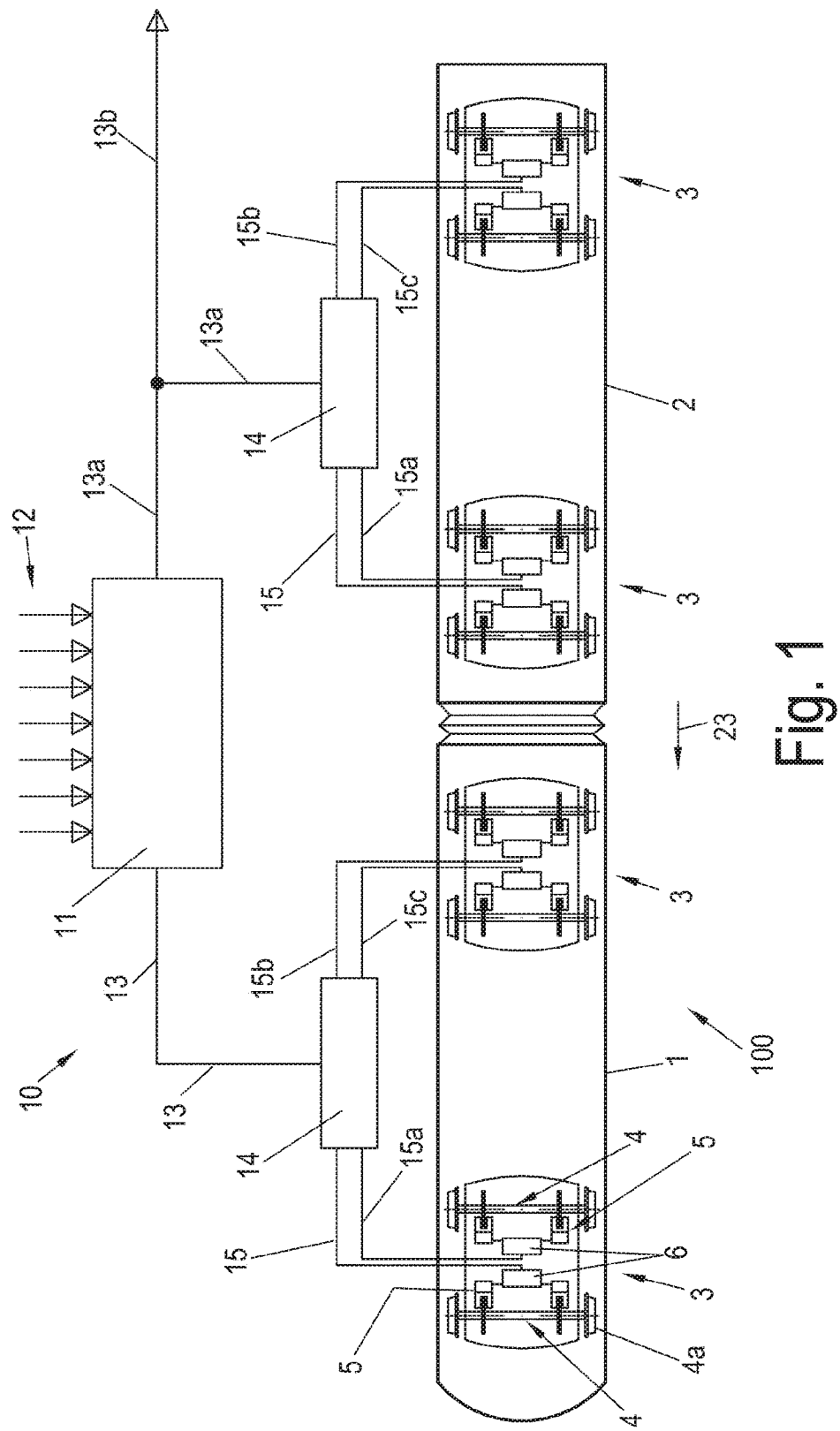
FIG. 1 shows an exemplary embodiment of a conditioning device according to the invention of a rail vehicle brake system according to the invention in a schematic view.
Figure 2:
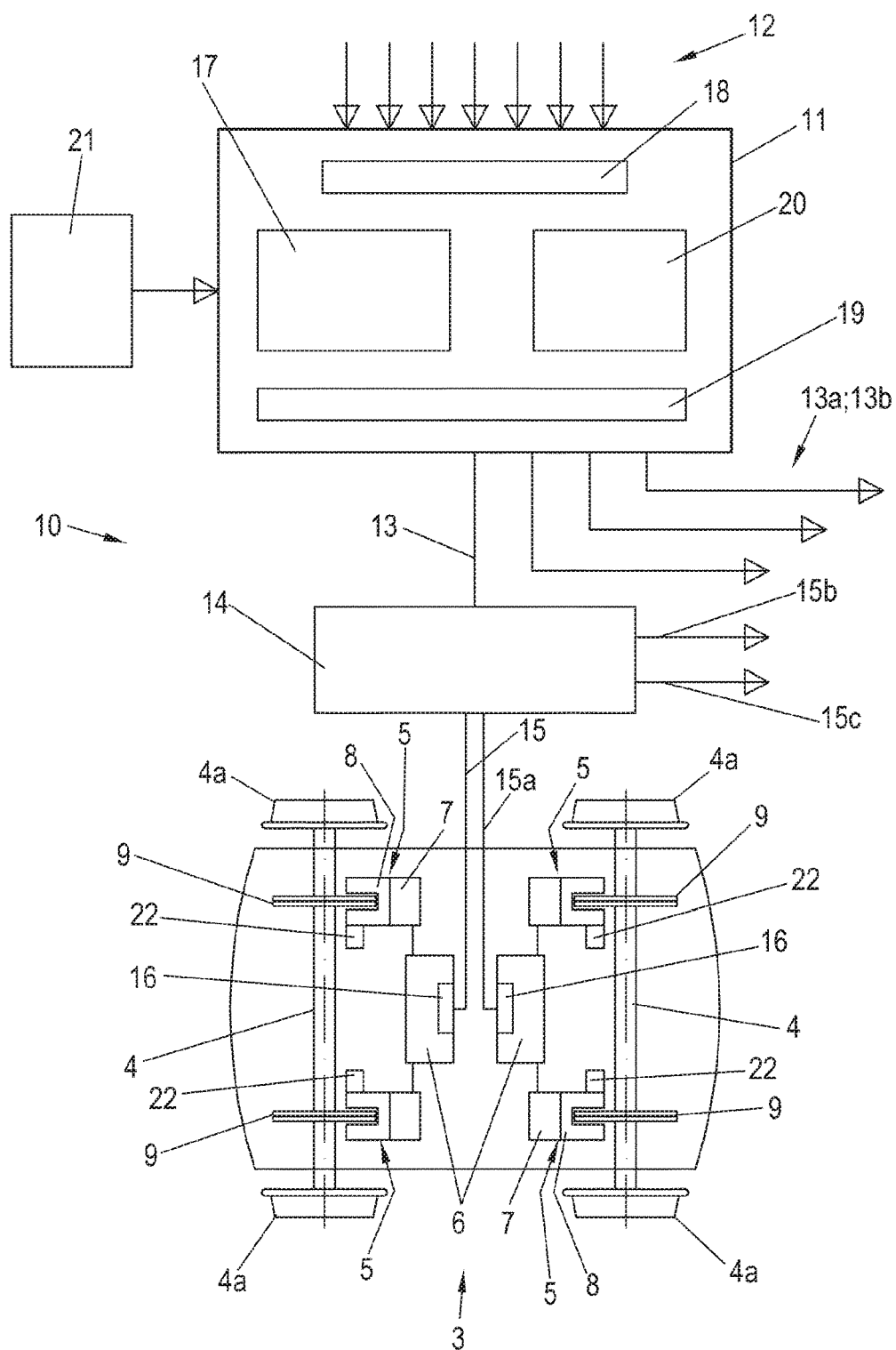
FIG. 2 shows the conditioning device according to FIG. 1 in a schematic block diagram.

In FIG. 1, an exemplary embodiment of a conditioning device 10 according to the invention of a rail vehicle brake system 100 according to the invention is shown in a schematic view. FIG. 2 shows the conditioning device 10 according to FIG. 1 in a schematic block diagram.

The term "whole vehicle" means a combination or a train of a plurality of rail vehicles 1, 2.

The rail vehicle 1, 2 is shown here schematically with two carriages of a high-speed train. In FIG. 1 on the left side a control carriage is shown as the first carriage, which can be moved forwards with a coupled train in a direction of travel 23. In this exemplary embodiment, each carriage comprises two bogies 3, each with two axles 4 and wheels 4a.

The whole vehicle is fitted with the rail vehicle brake system 100. The rail vehicle brake system 100 comprises a common, known pneumatic brake system and the conditioning device 10. The pneumatic brake system is not explained in detail here.

Each of the axles 4 has two associated brake units 5. The brake units 5 may be in the form of disc brakes. One brake unit 5 comprises an axle brake controller 6 and two brake cylinders 7, each with a brake calliper 8, whose brake elements (not shown) may be disposed with friction surfaces on both sides of a brake disc 9. The axle brake controller 6 may have a working connection to the brake cylinders 7 of the associated axle 4. Connections of the axle brake controller 6, e.g., to an associated compressed air system and associated common brake controller are not shown, wherein their functions and the function of such a disc brake are known and will not be explained further here.

The conditioning device 10 may be used for conditioning the friction partners of the friction brakes at a high temperature level. The friction partners are the brake disc 9 and the friction elements of the respective brake unit 5. In this exemplary embodiment the conditioning device 10 comprises a control device 11, at least one carriage control unit 14 and at least one coupling unit 16.

The conditioning device 10 forms a closed and independent system of pneumatic actuators and electronic controllers that controls only a portion of the pneumatic brake system of a train or compound train of rail vehicles 1, 2 depending on the train configuration.

In the event of suitable weather conditions, in particular in the event of outside temperatures of around or below 0° Celsius, this function can be continuously in operation depending on the requirement and regardless of other brake demands.

The control device 11 comprises a plurality of inputs 12, via which various project-specific factors can be provided to the control device 11. Such factors may be, e.g., the speed of the rail vehicle 1, 2, vehicle configuration, loading, coefficients of friction of the brake system, temperatures (e.g., external temperature, temperature of the brakes etc.), traction power, track information, etc. The provision of said factors takes place, e.g., by using a higher-level control system of the rail vehicle 1, 2 (e.g., a brake controller) and/or suitable sensors. For this purpose, the control device 11 is connected to the corresponding equipment that provides the project-specific factors in a suitable form (e.g., electric signals).

The control device 11 is connected using outputs 13, 13 a, 13 b to a carriage controller 14 in each case. Each carriage control unit 14 is in turn coupled to an axle brake controller 6 using outputs 15, 15 a, 15 b, 15 c and using a coupling unit 16 in each case. Thus e.g. the axle brake controller 6 of the first axle 4 (on the left in the drawing in FIG. 1) of the first rail vehicle 1 is connected using the output 15 to the carriage control unit 14 of the first rail vehicle 1 and the axle brake controller 6 of the second axle 4, which is disposed downstream in the direction opposite to the direction of travel 23, is connected to the carriage control unit 14 using the output 15 *a*. In the case of the second bogie 3 of the first rail vehicle 1, the axle brake controller 14 of the left axle 4 is connected to the carriage control unit 14 using the output 15 *b* and the axle brake controller 14 of the right axle 4 is connected to the carriage control unit 14 using the output 15 *c*. Said configuration is also representative of the second rail vehicle 2 and also for other rail vehicles of the associated train configuration that are not shown here.

The carriage control units 14, 14*a* are each connected to an output 13, 13*a* of the control device 11. One output 13*b* indicates connections to carriage control units 14 of other carriages of the train configuration.

In said exemplary embodiment the control device 11 comprises a control block 17, an input block 18, an output block 19 and a memory block 20. Moreover, the control device 11 can be connected to an operating unit 21.

The control block 17 comprises e.g. a microcomputer and is provided with suitable control software. This enables the control block 17 to selectively control the respective friction brakes via the output block 19 using the outputs 13, 13*a*, 13*b* and using the associated axle brake controller 6. Such control is used to carry out conditioning braking and takes place both depending on processes previously determined in the control software and also depending on the values of the project-specific factors of the inputs 12, which are connected to the input block 18. The input block 18 prepares the values of the project-specific factors provided at the inputs 12 in a suitable manner for the control block 17.

The memory block 20 is used to store e.g. tabular values, programs etc. It can also be a component of the control block 17.

The control block 17 automatically carries out the processes of conditioning braking using its control software, wherein the project-specific factors at the inputs 12 are used. The selective control of the respective friction brakes thus takes place in order to achieve a suitable minimum temperature and/or minimum power or necessary brake pressure, e.g. to prevent damaging water films between frictional elements and the brake disc 9. This is carried out by the closed, independent system of the conditioning device 10 at the axle level, bogie level or carriage level in a defined sequence for a defined time depending on the train configuration. This enables higher brake pressures and temperatures to prevent harmful water films between the friction partners.

Selective control at the axle level means that the control device 11 first controls the axle brake controller 6 for the first axle 4 (FIG. 2, left axle 4) using the carriage control unit 14, then controls the axle brake controller 6 for the second axle 4 using the carriage control unit 14 and so on.

If the selective control is carried out at the bogie level, the control of both (or all) axles 4 of the respective bogie 3 is performed on the axle brake controllers 6 of the axles 4 of the bogie 3 by the control device 11 using the carriage control unit 14 (see FIGS. 1 and 2).

Selective control at the carriage level can be seen in FIG. 1, wherein the control device 11 acts using the carriage control unit 14 on all axle brake controllers 6 of all axles 4 of the associated carriage.

The coupling unit 16 forms an interface between the carriage brake controller 14 and the respective axle brake controller 6, such as e.g. electropneumatic actuators.

The operating device 21 enables a manual intervention using suitable operating elements. This enables the conditioning device 10 to switch on or/and off independently of its automatic system.

Additional measuring devices 22 that are e.g. in the form of sensors for temperature, humidity etc. can be disposed on the brake units 5. Said measuring devices 22 are connected to the control device 11 using the carriage control unit 14 and are used as additional factors that the conditioning device 10 uses.

Figure 3:
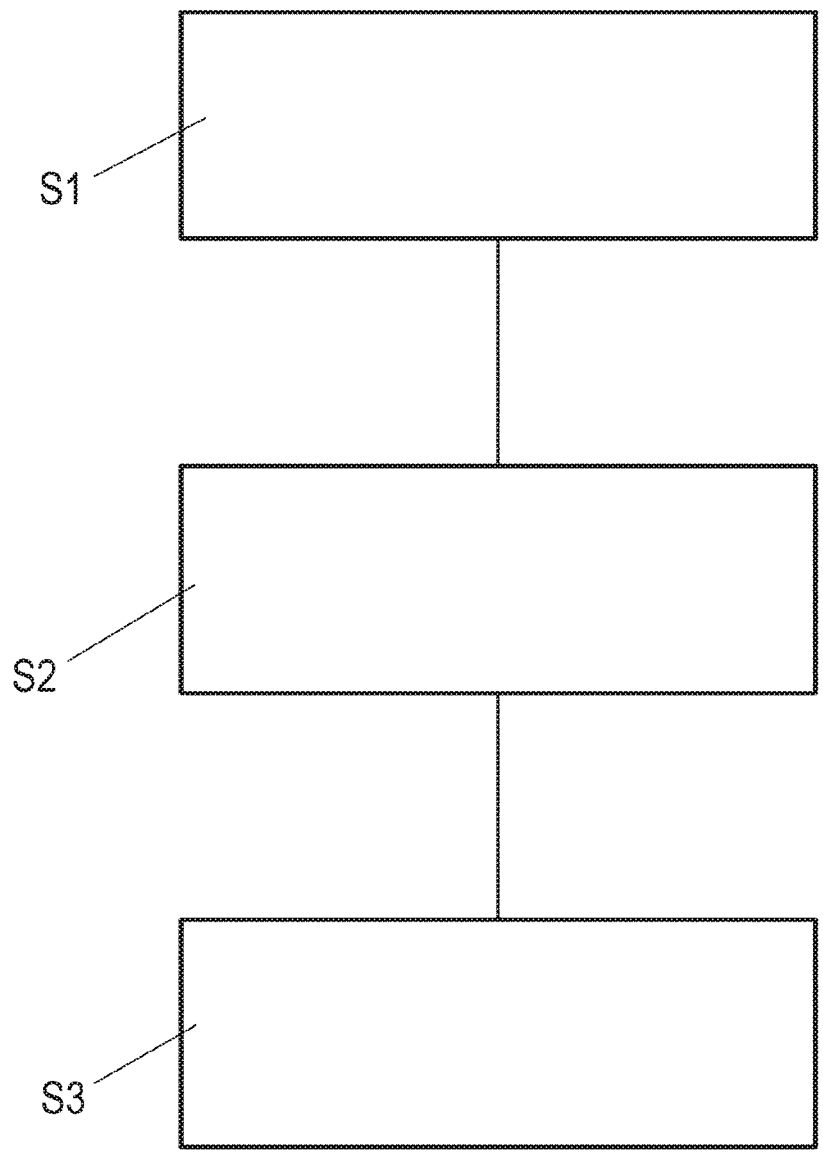
FIG. 3 shows a schematic flow diagram of a method according to the invention for the operation of the conditioning device according to FIG. 1.

FIG. 3 shows a schematic flow diagram of a method according to disclosed embodiments for the operation of the conditioning device 10 according to FIG. 1.

FIG. 3 also shows a schematic flow diagram of a method according to disclosed embodiments for deicing and/or for preventing icing of a brake unit 5 of a rail vehicle brake system 100 according to FIG. 1.

The operation of the conditioning device 10 is activated in a first procedural step S1. This takes place automatically according to a previously determined schedule for likewise previously determined time segments. The operation of the conditioning device 10 can also be manually switched on/off and/or influenced.

In a second procedural step S2, the project-specific factors at the inputs 12 of the control device 11 are recorded. Other parameters, e.g. a current temperature in the immediate vicinity of the brake units or of functional components of the brake units (brake calliper, friction element, brake disc), can also be determined here.

In the case of the method for deicing and/or for preventing icing of a brake unit 5, the brake temperature of the brake unit 5 at the inputs 12 of the control device 11 of the conditioning device 10 is recorded in the second procedural step S2.

The conditioning device 10 is then operated for conditioning braking such that brake units of the friction brakes are selectively controlled using the recorded, project-specific factors in a third procedural step S3. The selective control is carried out in a defined sequence for a defined time at the axle, bogie or carriage level depending on the train configuration.

The selective control is regulated in combination with simultaneously recorded measurement values, e.g. vehicle speed, traction power, brake pressure, brake temperature etc., such that the operating speed of the whole vehicle is unchanged or is essentially unchanged.

In the case of simultaneous braking demands, of course the braking demands for conditioning braking have priority.

It is also possible that using the recorded project-specific factors, control of the friction brakes can take place outside of the defined sequence, e.g. in the event of temperatures at the brake units being above or below a specified temperature value as a limit value. The conditioning device 10 can also be operated using a manual intervention at any time if an operator considers this to be necessary using displayed measurement values.

The conditioning device 10 is operated such that conditioning of the friction partners takes place at a high temperature level. During this, high contact pressures are used in combination with minimal decelerations of the whole vehicle. Furthermore, a minimal increase in the traction power of the whole vehicle takes place during the operation of the conditioning device 10 during conditioning braking. The operating speed of the whole vehicle can thus be maintained during continuous conditioning braking.

The conditioning device 10 can be implemented as an integral, independent component of the brake controller or vehicle controller or even as a separate functional unit.

The control device 11 is designed, in particular, in such a way that selective control of respective brake unit(s) 5 can be activated when the brake temperature falls below a previously defined limit value.

The disclosed innovation is not limited to the exemplary embodiment described above, but can be modified within the scope of the claims.

The conditioning device 10 can also be used for a single rail vehicle, e.g. a high-speed railcar.

The bogies 3 can thus also comprise more than two axles 4. Single axles 4 that are not disposed in bogies 3 are also conceivable.

The conditioning device 10 can also be connected to a display device (not shown) that displays the respective operating state and other parameters, such as e.g. temperatures (external temperature, brake temperature, etc.).

REFERENCE CHARACTER LIST 1, 2 rail vehicle
3 bogie
4 axle
4a wheel
5 brake unit
6 axle brake controller
7 brake cylinder
8 brake calliper
9 brake disc
10 conditioning device
11 control device
12 input
13, 13a, 13b output
14 carriage control unit
15, 15a-15c output
16 coupling unit
17 control block
18 input block
19 output block
20 memory device
21 operating unit
22 measurement device
23 direction of travel
S1 . . . 3 procedural step

The invention claimed is:

1. A rail vehicle brake system, for a high-speed rail vehicle, the system comprising:
a conditioning device; and
at least one disc brake per axle,
wherein the conditioning device comprises a control device configured for selective control of conditioning braking according to a predetermined schedule of time segments while maintaining an operating speed of the high-speed rail vehicle via the at least one disc brake per axle with at least one carriage control unit and at least one coupling unit.

2. The rail vehicle brake system of claim 1, wherein the conditioning device provides selective control of the at least one disc brake per axle at the axle level such that the control device is coupled to an axle brake controller of the at least one disc brake.

3. The rail vehicle brake system of claim 1, wherein the conditioning device provides selective control of the at least one disc brake per axle at the bogie level or/and at the carriage level such that the control device is coupled by means of the carriage control unit to the axle brake controller of each of at least one disc brake per axle.

4. The rail vehicle brake system of claim 1, wherein the conditioning device is coupled by the at least one coupling unit to the axle brake controller of the at least one disc brake.

5. The rail vehicle brake system of claim 4, wherein the conditioning device is designed as a closed and independent system with pneumatic actuators and electronic controllers.

6. The rail vehicle brake system of claim 1 wherein the conditioning device further comprises an operating unit.

7. The rail vehicle brake system of claim 1, wherein the control device of the conditioning device comprises inputs for project-specific factors, wherein the project-specific factors include at least one of speed, vehicle configuration, loading, coefficients of friction, external temperature, traction power, and distance.

8. The rail vehicle brake system of claim 1, wherein the conditioning device is designed as an integral component of a brake controller, a vehicle controller or as a separate functional unit.

9. The rail vehicle brake system of claim 1, wherein selective control of respective brake unit is activated in response to the brake temperature falls below a previously defined limit value.

10. A conditioning device for a rail vehicle brake system for a high-speed rail vehicle, wherein the conditioning device comprises a control device configured for selective control of conditioning braking according to a predetermined schedule while maintaining an operating speed of the high-speed rail vehicle via at least one disc brake per axle of the rail vehicle brake system with at least one carriage control unit and at least one coupling unit.

11. A method for the operation of a conditioning device for a rail vehicle brake system for a high-speed rail vehicle, wherein the conditioning device comprises a control device, and is designed for selective control of at least one disc brake per axle of the rail vehicle brake system with at least one carriage control unit and at least one coupling unit, the method comprising:
automatically activating the conditioning device according to a predetermined schedule;
recording project-specific factors at the inputs of the control device of the conditioning device; and
selectively controlling of brake units of the rail vehicle brake system for the operation of the conditioning device to perform conditioning braking while maintaining an operating speed of the high-speed rail vehicle.

12. The method of claim 11, wherein the activation takes place automatically or/and manually.

13. The method of claim 11, wherein recording project-specific factors, additional parameters are recorded including temperatures in the immediate vicinity of the brake units or of functional components of the brake units.

14. The method of claim 11, wherein selective control at the axle, bogie or carriage level is performed in a defined sequence for a defined time depending on the train configuration.

15. The method of claim 11, wherein selective control with simultaneously recorded measurement values of at least one of vehicle speed, traction power, brake pressure, and brake temperature is regulated such that the operating speed of the whole vehicle is unchanged or is essentially unchanged.

16. The method of claim 11, wherein selective control using the recorded project-specific factors, control of the friction brakes takes place outside of the defined sequence in response to a factor exceeding or falling below a previously specified limit value.

17. The method of claim 11, wherein selective control using the recorded project-specific factors, control of the friction brakes takes place outside of the defined sequence if the brake temperature falls below a previously specified limit value.

18. The method for deicing and/or for preventing icing of a brake unit of a rail vehicle brake system for a high-speed rail vehicle, the system including a conditioning device, and at least one disc brake per axle, wherein the conditioning device comprises a control device, and is designed for selective control of the at least one disc brake per axle with at least one carriage control unit and at least one coupling unit, the method comprising:
  automatically activating the conditioning device according to a predetermined schedule of time segments;
  recording a brake temperature of the brake unit at the inputs of the control device of the conditioning device; and
  selectively controlling of brake units of the rail vehicle brake system for deicing and/or for preventing icing of the brake unit.

\* \* \* \* \*